3,743,657
ESTERS OF 1,3-PENTADIENE-1-CARBOXYLIC ACID
AND PROCESS FOR PREPARING SAME
Toshio Watanabe, Takatsuki, Ryoichi Higuchi, Kyoto, Akihiro Yamato, Suita, and Kazuo Sakai, Ikeda, Japan, assignors to Tanabe Seiyaku Co., Ltd., Osaka, Japan
No Drawing. Filed Aug. 11, 1971, Ser. No. 172,341
Claims priority, application Japan, Aug. 20, 1970,
45/73,330, 45/73,331
Int. Cl. C07d 13/10
U.S. Cl. 260—340.5         14 Claims

ABSTRACT OF THE DISCLOSURE

A compound of the formula:

R—OH wherein R is a radical selected from the group consisting of benzyl, methylbenzyl, methoxybenzyl, trimethoxybenzyl, dimethylaminobenzyl, phenethyl, phenylpropyl, methylenedioxyphenyl - propyl, octyloxyphenyl - propyl, bornyl, 2-methoxy-4-allylphenyl, 3,7-dimethyl-2,6-octadiene-1-yl and methylenedioxycinnamyl, is condensed with 1,3-pentadiene-1-carboxylic acid, or the corresponding acid halide or acid anhydride. The compounds of the formula:

$$CH_3—CH=CH—CH=CH—COOR$$

wherein R has the same meaning as defined above, are produced. These compounds are useful as a deodorant.

---

This invention relates to novel esters of 1,3-pentadiene-1-carboxylic acid and a process for preparing same.

The 1,3-pentadiene-1-carboxylic acid esters of the present invention are represented by the formula:

$$CH_3—CH=CH—CH=CH—COOR \qquad (I)$$

wherein R is a radical selected from the group consisting of benzyl, methylbenzyl, methoxybenzyl, trimethoxybenzyl, dimethylaminobenzyl, phenethyl, phenylpropyl, methylenedioxyphenyl - propyl, octyloxyphenyl - propyl, bornyl, 2-methoxy-4-allylphenyl, 3,7-dimethyl-2,6-octadiene-1-yl and methylenedioxycinnamyl.

We have now found that the 1,3-pentadiene-1-carboxylic acid esters (I) are useful as a deodorant. The esters (I) of the present invention show a remarkable deodorizing effect over various malodors. For instance, amino compounds (e.g., amonia, triethylamine, indole, scatole, aniline, pyridine), sulfur compounds (e.g., methyl sulfide, phenyl sulfide, ethyl mercaptane, thiophenol, hydrogen sulfide, sulfurous anhydride), acrolein, acetaldehyde, benzaldehyde etc. are well known as the components of malodors which are frequently encountered in kitchens, lavatories, vehicles and other confined spaces. However, these malodorous components can be effectively deodorized in the presence of the esters (I) of the present invention. As will be seen in the experiment mentioned hereinafter, the deodorizing activity of the esters (I) against hydrogen sulfide gas are superior to that of the activated carbon.

According to the present invention, the 1,3-pentadiene-1-carboxylic acid ester (I) can be prepared by reacting a carbinol compound of the formula:

R—OH         (II)

wherein R has the same meaning as defined above, with 1,3-pentadiene-1-carboxylic acid or a functional derivative thereof.

The condensation reaction of the present invention can be accomplished by conventional manner. For instance, the 1,3-pentadiene-1-carboxylic acid ester (I) is readily obtained by mixing the carbinol compound (II) and 1,3-pentadiene-1-carboxylic acid in the presence of a dehydrating agent. Preferred examples of the dehydrating agent include an alkyl posyphosphate (e.g., ethyl polyphosphate), N,N'-dicyclohexyl-carbodiimide, N-ethyl-N'-dimethylaminopropyl-carbodiimide and the like. Ether, methylenedichloride and dioxane are siutable as the reaction solvent. It is preferred to carry out the reaction at 20° to 120° C.

Alternatively, a functional derivative (e.g., an acid anhydride, an acid halide) of 1,3-pentadiene-1-carboxylic acid may be employed as one of the starting materials of the present invention. When 1,3-pentadiene-1-carboxylic acid anhydride is employed as the starting material, the reaction can be carried out by mixing said anhydride and the carbinol compound (II) in an inert solvent. Pyridine and acetic acid are suitable as the reaction solvent. It is preferred to carry out the reaction at 20° to 120° C. When 1,3-pentadiene-1-carbonyl halide is employed, the condensation reaction with the carbinol compound (II) can be carried out in the presence of a basic agent. An organic base (e.g., pyridine, triethylamine) and an inorganic base (e.g., alkali metal carbonate, alkali metal hydroxide) are suitable as the basic agent. Chloroform, benzene and ether may be suitably employed as the reaction solvent. In the latter case, however, it is not essential to use such a reaction solvent. If the excess amount of an organic base is employed, it also serves as the reaction solvent. It is preferred to carry out the reaction at 0° to 100° C.

The 1,3-pentadiene-1-carboxylic acid ester (I) thus obtained may be employed as a deodorant in the form of a solution. For instance, the ester (I) is dissolved in a solvent (e.g., acetone, chloroform, ethanol), and the solution is added dropwise to malodorous causes in order to deodorize said causes. For deodorization of air in a confined space, it is preferred to propellate the ester (I) by means of a dispensing device such as an aerosol dispenser. In this case, the ester (I) of the invention is sprayed with a solvent, a propellant or a mixture thereof. Preferred examples of the propellant include dichloro-difluoro-methane, dichloro-monofluoro-methane, dichloro-tetra-fluoroethane and the like. Water, ethanol, isopropanol, acetone, propyleneglycol, glycerine and polyethyleneglycol are suitable as the solvent. Alternatively, the 1,3-pentadiene-1-carboxylic acid ester (I) may be employed in the solid form, for instance, by incorporating said ester with a soap, activated carbon and a thick paper.

The concentration of the 1,3-pentadiene-1-carboxylic acid ester (I) to be added may vary over a wide range dependent upon the properties desired in the deodorant composition. In general, however, satisfactory results may be obtained when the concentration of the ester (I) is within the range of about 0.1 to about 30 weight percent, based on the total weight of the deodorant composition. In some cases, a plurality of the 1,3-pentadiene-1-carboxylic acid ester (I) may be employed as active ingredients of the deodorant composition instead of a single ester. Moreover, the deodorant composition of the invention may contain antibacterial agents. Preferred agents of this type include 1,3-pentadiene-1-carboxylic acid, salts thereof (e.g., sodium salt, potassium salt) or lower alkyl esters thereof (e.g., methyl, ethyl, propyl and butyl esters). The deodorant composition of the present invention may also contain perfumes, auxiliaries (e.g., stabilizing, emulsifying agent) and/or other valuable substances.

Practical and presently preferred embodiments of the present invention are illustratively shown in the following examples.

EXPERIMENT

A vessel of 1000 ml. volume was filled at room temperature with a mixture of two parts (by volume) of ammonia gas and one part (by volume) of hydrogen sulfide gas. 5 mg. of the compound tabulated in Table or 50 mg. of the activated carbon were placed into the vessel. After sealing, the vessel was allowed to stand for 5 minutes at the same temperature. Then, the volume of each of ammonia gas and hydrogen sulfide gas in the vessel was measured by introducing the mixed gas of the vessel into Kitagawa's ammonia-detector and Kitagawa's hydrogen sulfide-detector, successively. The remaining percentages of each of ammonia gas and hydrogen sulfide gas in the vessel was estimated in comparison with the concentration of the corresponding gas in a control vessel. The results are shown in Table.

TABLE

| | Remaining percentages | |
|---|---|---|
| | Ammonia gas | Hydrogen sulfide gas |
| Ester of 1,3-pentadiene-1-carboxylic acid: | | |
| Benzyl ester | 75 | 48 |
| p-Methoxybenzyl ester | 78 | 55 |
| p-Methylbenzyl ester | 73 | 42 |
| 3,4,5-trimethoxybenzyl ester | 80 | 41 |
| p-Dimethylamino-benzyl ester | 84 | 48 |
| Phenethyl ester | 82 | 50 |
| 3-phenylpropyl ester | 79 | 51 |
| 3-(2,3-methylenedioxyphenyl)-propyl ester | 77 | 47 |
| 3-(p-n-octyloxyphenyl)-propyl ester | 81 | 47 |
| Bornyl ester | 70 | 38 |
| 2-methoxy-4-allylphenyl ester | 75 | 58 |
| 3,7-dimethyl-2,6-octadiene-1-yl ester | 88 | 53 |
| 3,4-methylenedioxy-cinnamyl ester | 82 | 50 |
| Activated carbon | 85 | 72 |
| Control | 100 | 100 |

EXAMPLE 1

3 g. of benzyl alcohol are dissolved in 10 ml. of pyridine. 5 g. of 1,3-pentadiene-1-carbonyl chloride are added dropwise to the solution under stirring. The mixture is stirred for 2 hours at 0° C. on an ice-bath and is further stirred for 3 hours at room temperature. After the reaction is completed, pyridine is removed by distillation. The residue thus obtained is dissolved in 100 ml. of ether. The ether solution is washed with 10% aqueous hydrochloric acid, water, an aqueous sodium bicarbonate solution and water, successively. The solution is dried with anhydrous sodium sulfate. Then, the solution is evaporated to remove ether, and the residue thus obtained is distilled under reduced pressure. 5 g. of benzyl ester of 1,3-pentadiene-1-carboxylic acid are obtained. B.P. 120° C./0.1 mm. Hg.

The infrared absorption spectrum:

$$\lambda_{max}^{film}: 1718 \text{ cm.}^{-1} \text{ (C=O)}$$

EXAMPLE 2

3 g. of p-methoxybenzyl alcohol and 5 g. of pyridine are dissolved in 30 ml. of benzene. 5 g. of 1,3-pentadiene-1-carbonyl chloride are added dropwise to the solution under stirring. Then, the mixture is treated in the same manner as described in Example 1. 5.5 g. of p-methoxybenzyl ester of 1,3-pentadiene-1-carboxylic acid are obtained. B.P. 128° C./0.07 mm. Hg.

The infrared absorption spectrum:

$$\lambda_{max}^{film}: 1710 \text{ cm.}^{-1} \text{ (C=O)}$$

EXAMPLE 3

3 g. of p-methylbenzyl alcohol are dissolved in 10 ml. of pyridine. 5 g. of 1,3-pentadiene-1-carbonyl chloride are added dropwise to the solution under stirring. Then, the mixture is treated in the same manner as described in Example 1. 5.5 g. of p-methylbenzyl ester of 1,3-pentadiene-1-carboxylic acid are obtained as yellow oil. B.P. 128° C./0.07 mm. Hg.

The infrared absorption spectrum:

$$\lambda_{max}^{film}: 1710 \text{ cm.}^{-1} \text{ (C=O)}$$

EXAMPLE 4

3 g. of 3,4,5-trimethoxybenzyl alcohol are dissolved in 10 ml. of pyridine. 5 g. of 1,3-pentadiene-1-carbonyl chloride are added dropwise to the solution under stirring. Then, the mixture is treated in the same manner as described in Example 1. 4.5 g. of 3,4,5-trimethoxybenzyl ester of 1,3-pentadiene-1-carboxylic acid are obtained. B.P. 173° C./0.07 mm. Hg.

The infrared absorption spectrum:

$$\lambda_{max}^{film}: 1710 \text{ cm.}^{-1} \text{ (C=O)}$$

EXAMPLE 5

3 g. of p-dimethylamino-benzyl alcohol are dissolved in 10 ml. of pyridine. 5 g. of 1,3-pentadiene-1-carbonyl chloride are added dropwise to the solution under stirring. The mixture is stirred for 2 hours at 0° C. on an ice-bath and is further stirred for 3 hours at room temperature. After the reaction is completed, pyridine is removed by distillation. The residue thus obtained is dissolved in 100 ml. of ether. The ether solution is washed with water, an aqueous sodium bicarbonate solution and water, successively. Then, the solution is evaporated to remove ether, and the residue thus obtained is distilled under reduced pressure. 4.7 g. of p-dimethylamino-benzyl ester of 1,3-pentadiene-1-carboxylic acid are obtained. B.P. 135° C./0.07 mm. Hg.

The infrared absorption spectrum:

$$\lambda_{max}^{film}: 1710 \text{ cm.}^{-1} \text{ (C=O)}$$

EXAMPLE 6

3 g. of phenethyl alcohol are dissolved in 10 ml. of pyridine. 5 g. of 1,3-pentadiene-1-carbonyl chloride are added dropwise to the solution under stirring. Then, the mixture is treated in the same manner as described in Example 1. 4.5 g. of phenethyl ester of 1,3-pentadiene-1-carboxylic acid are obtained as an oil. B.P. 135° C./0.08 mm. Hg.

The infrared absorption spectrum:

$$\lambda_{max}^{film}: 1715 \text{ cm.}^{-1} \text{ (C=O)}$$

EXAMPLE 7

3 g. of 3-phenylpropyl alcohol are dissolved in 10 ml. of pyridine. 6 g. of 1,3-pentadiene-1-carbonyl chloride are added dropwise to the solution under stirring. Then, the mixture is treated in the same manner as described in Example 1. 5 g. of 3-phenylpropyl ester of 1,3-pentadiene-1-carboxylic acid are obtained. B.P. 136° C./0.07 mm. Hg.

The infrared absorption spectrum:

$$\lambda_{max}^{film}: 1715 \text{ cm.}^{-1} \text{ (C=O)}$$

EXAMPLE 8

3 g. of 3-(2,3-methylenedioxyphenyl)-propyl alcohol are dissolved in 10 ml. of pyridine. 6 g. of 1,3-pentadiene-1-carbonyl chloride are added dropwise to the solution under stirring. Then, the mixture is treated in the same manner as described in Example 1. 4.7 g. of 3-(2,3-methylenedioxyphenyl)-propyl ester of 1,3-pentadiene-1-carboxylic acid are obtained. B.P. 176° C./0.075 mm. Hg.

The infrared absorption spectrum:

$$\lambda_{max}^{film}: 1710 \text{ cm.}^{-1} \text{ (C=O)}$$

EXAMPLE 9

3 g. of 3-(p-n-octyloxyphenyl)-propyl alcohol are dissolved in 10 ml. of pyridine. 6 g. of 1,3-pentadiene-1-carbonyl chloride are added dropwise to the solution under stirring. Then, the mixture is treated in the same manner as described in Example 1. 4 g. of 3-(p-n-octyloxyphenyl)- propyl ester of 1,3-pentadiene-1-carboxylic acid are obtained. B.P. 197° C./0.04 mm. Hg.

The infrared absorption spectrum:

$\lambda_{max.}^{film}$: 1715 cm.$^{-1}$ (C=O)

EXAMPLE 10

3 g. of borneol are dissolved in 10 ml. of pyridine. 5 g. of 1,3-pentadiene-1-carbonyl chloride are added dropwise to the solution under stirring. Then, the mixture is treated in the same manner as described in Example 1. 4.5 g. of bornyl ester of 1,3-pentadiene-1-carboxylic acid are obtained. B.P. 129.5° C./2 mm. Hg.

The infrared absorption spectrum:

$\lambda_{max.}^{film}$: 1710 cm.$^{-1}$ (C=O)

EXAMPLE 11

3 g. of eugenol are dissolved in 10 ml. of pyridine. 5 g. of 1,3-pentadiene-1-carbonyl chloride are added dropwise to the solution under stirring. Then, the mixture is treated in the same manner as described in Example 1. 3.5 g. of 2-methoxy-4-allylphenyl ester of 1,3-pentadiene-1-carboxylic acid are obtained. B.P. 148° C./0.05 mm. Hg. M.P. 61° C.

The infrared absorption spectrum:

$\lambda_{max.}^{film}$: 1720 cm.$^{-1}$ (C=O)

EXAMPLE 12

3 g. of geraniol are dissolved in 10 ml. of pyridine. 5 g. of 1,3-pentadiene-1-carbonyl chloride are added dropwise to the solution under stirring. Then, the mixture is treated in the same manner as described in Example 1. 4.5 g. of 3,7-dimethyl-2,6-octadiene-1-yl ester of 1,3-pentadiene-1-carboxylic acid are obtained. B.P. 126° C./0.04 mm. Hg.

The infrared absorption spectrum:

$\lambda_{max.}^{film}$: 1715 cm.$^{-1}$ (C=O)

EXAMPLE 13

3 g. of 3,4-methylenedioxy-cinnamyl alcohol are dissolved in 100 ml. of pyridine. 5 g. of 1,3-pentadiene-1-carbonyl chloride are added dropwise to the solution under stirring. Then, the solution is treated in the same manner as described in Example 1. 4 g. of 3,4-methylenedioxycinnamyl ester of 1,3-pentadiene-1-carboxylic acid are obtained. B.P. 161° C./0.07 mm. Hg.

The infrared absorption spectrum:

$\lambda_{max.}^{film}$: 1705 cm.$^{-1}$ (C=O)

What we claim is:
1. A compound of the formula:

$CH_3—CH=CH—CH=CH—COOR$ wherein R is a radical selected from the group consisting of benzyl, methylbenzyl, methoxybenzyl, trimethoxybenzyl, dimethylaminobenzyl, phenethyl, phenylpropyl, methylenedioxyphenyl-propyl, octyloxyphenyl-propyl, bornyl, 2-methoxy-4-allylphenyl, 3,7-dimethyl-2,6-octadiene-1-yl and methylenedioxycinnamyl.

2. The compound as claimed in claim 1, wherein R is bornyl.
3. The compound as claimed in claim 1, wherein R is 2-methoxy-4-allylphenyl.
4. The compound as claimed in claim 1, wherein R is 3,7-dimethyl-2,6-octadiene-1-yl.
5. The compound as claimed in claim 1, wherein R is benzyl.
6. The compound as claimed in claim 1, wherein R is p-methylbenzyl.
7. The compound as claimed in claim 1, wherein R is p-methoxybenzyl.
8. The compound as claimed in claim 1, wherein R is 3,4,5-trimethoxybenzyl.
9. The compound as claimed in claim 1, wherein R is p-dimethylamino-benzyl.
10. The compound as claimed in claim 1, wherein R is phenethyl.
11. The compound as claimed in claim 1, wherein R is 3-phenylpropyl.
12. The compound as claimed in claim 1, wherein R is 3-(2,3-methylenedioxyphenyl)-propyl.
13. The compound as claimed in claim 1, wherein R is 3-(p-n-octyloxyphenyl)-propyl.
14. The compound as claimed in claim 1, wherein R is 3,4-methylenedioxy-cinnamyl.

References Cited

UNITED STATES PATENTS 3,326,936  7/1967  Allingham _____ 260—486 R

OTHER REFERENCES

Selisko, "Chemical Abstracts," vol. 52, 1958, col. 5327.
Charles et al., "Chemical Abstracts," vol. 54, 1960, col. 3863h.
Sakai et al., "Chemical Abstracts," vol. 48, 1954, col. 13974e.
Gaind et al., "Chemical Abstracts," vol. 65 (1966), col. 17389h.

ALEX MAZEL, Primary Examiner

J. H. TURNIPSEED, Assistant Examiner

U.S. Cl. X.R.

252—522; 260—479 R, 486 R